(12) United States Patent
Chao

(10) Patent No.: US 9,495,728 B2
(45) Date of Patent: Nov. 15, 2016

(54) METHOD FOR EDGE DETECTION, METHOD FOR MOTION DETECTION, METHOD FOR PIXEL INTERPOLATION UTILIZING UP-SAMPLING, AND APPARATUSES THEREOF

(75) Inventor: Po-Wei Chao, Taipei Hsien (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1366 days.

(21) Appl. No.: 11/842,121

(22) Filed: Aug. 20, 2007

(65) Prior Publication Data

US 2008/0049977 A1 Feb. 28, 2008

(30) Foreign Application Priority Data

Aug. 24, 2006 (TW) .............................. 95131134 A

(51) Int. Cl.
| | |
|---|---|
| *H04N 7/01* | (2006.01) |
| *H04N 11/20* | (2006.01) |
| *G06K 9/32* | (2006.01) |
| *G06T 3/40* | (2006.01) |

(52) U.S. Cl.
CPC .............. *G06T 3/403* (2013.01); *H04N 7/012* (2013.01); *H04N 7/0135* (2013.01); *H04N 7/0137* (2013.01); *H04N 7/0142* (2013.01)

(58) Field of Classification Search
USPC ......................................... 382/300; 348/452
See application file for complete search history.

(56) References Cited

U.S. PATENT DOCUMENTS

| | | | |
|---|---|---|---|
| 5,134,480 A | | 7/1992 | Wang |
| 5,555,097 A | * | 9/1996 | Joung et al. .................. 386/201 |
| 5,929,918 A | * | 7/1999 | Marques Pereira ... H04N 7/012 348/448 |

(Continued)

FOREIGN PATENT DOCUMENTS

| | | |
|---|---|---|
| TW | 457782 | 10/2001 |
| TW | 533741 | 5/2003 |
| TW | 594659 | 6/2004 |

OTHER PUBLICATIONS

Lin et al., "Motion Adaptive Interpolation with Horizontal Motion Detection for Deinterlacing", IEEE Transactions on Consumer Electronics, vol. 49, No. 4, Nov. 2003, pp. 12-56-1265.*

(Continued)

*Primary Examiner* — Matthew Bella
*Assistant Examiner* — Jose M Torres
(74) *Attorney, Agent, or Firm* — McClure, Qualey & Rodack, LLP

(57) ABSTRACT

A pixel interpolation method for interpolating a pixel value of a target pixel in a target picture is disclosed. The pixel interpolation method includes performing up-sampling upon the target picture for generating an up-sampled picture corresponding to the target picture, and interpolating the target pixel according to the up-sampled picture. The step of performing up-sampling upon the target picture includes interpolating and generating a third pixel in between a first pixel and a second pixel that are a pair of two adjacent pixels of each pixel line of the target picture, whereof a pixel value of the third pixel is an average of pixel values of the first pixel and the second pixel.

7 Claims, 7 Drawing Sheets

(56) References Cited

U.S. PATENT DOCUMENTS

| | | | | |
|---|---|---|---|---|
| 5,936,676 | A * | 8/1999 | Ledinh | H04N 7/012 348/451 |
| 5,991,463 | A * | 11/1999 | Greggain et al. | 382/298 |
| 6,133,957 | A * | 10/2000 | Campbell | G06T 3/403 348/441 |
| 6,141,056 | A * | 10/2000 | Westerman | H04N 7/012 348/441 |
| 6,417,887 | B1 | 7/2002 | Yamaji | |
| 6,421,090 | B1 | 7/2002 | Jiang | |
| 6,545,719 | B1 | 4/2003 | Topper | |
| 6,577,345 | B1 * | 6/2003 | Lim | H04N 7/012 348/448 |
| 6,784,942 | B2 | 8/2004 | Selby | |
| 6,940,557 | B2 * | 9/2005 | Handjojo et al. | 348/452 |
| 6,986,081 | B1 | 1/2006 | Furutani | |
| 6,987,893 | B2 * | 1/2006 | Kim | 382/300 |
| 7,012,649 | B2 * | 3/2006 | Michel | H04N 7/012 348/448 |
| 7,142,247 | B2 * | 11/2006 | Jung | 348/452 |
| 7,206,027 | B2 * | 4/2007 | De Haan | G06T 3/403 348/448 |
| 7,259,794 | B2 * | 8/2007 | Chang et al. | 348/452 |
| 7,379,626 | B2 * | 5/2008 | Lachine et al. | 382/300 |
| 7,423,691 | B2 * | 9/2008 | Orlick | H04N 7/012 348/441 |
| 7,787,048 | B1 * | 8/2010 | Vojkovich | H04N 7/012 348/448 |
| 2005/0179814 | A1 * | 8/2005 | Pau | H04N 5/145 348/448 |
| 2006/0222267 | A1 | 10/2006 | Chao | |
| 2007/0206117 | A1 * | 9/2007 | Tian | H04N 7/012 348/452 |
| 2008/0080790 | A1 * | 4/2008 | Hori | H04N 7/012 382/300 |

OTHER PUBLICATIONS

Deame, "Motion Compensated De-Interlacing: The Key to the Digital Video Transition", Presented at the SMPTE 141st Technical Conference in NY, Ver. 1.1, Nov. 19-22, 1999, pp. 1-6.*

Tai et al., "A Motion and Edge Adaptive Deinterlacing Algorithm", 2004 IEEE International Conference on Multimedia and Expo, pp. 659-662.*

Chin-Chuan Liang, Title: Motion Compensated Deinterlacing for Video Line Doubler Algorithm Research, Dissertation for Master of Philosophy, Jan. 2003, p. 18-20, figure 2.14-2.16, 2.19, 3.2, Department of Electrical Engineering National Taiwan University,Taiwan, R. O. C.

* cited by examiner

METHOD FOR EDGE DETECTION, METHOD FOR MOTION DETECTION, METHOD FOR PIXEL INTERPOLATION UTILIZING UP-SAMPLING, AND APPARATUSES THEREOF

BACKGROUND OF THE INVENTION

1. Field of the Invention

The present invention relates to an image processing technology, and more particularly, to an edge detection method, a motion detection method, a pixel interpolation method utilizing up-sampling, and apparatuses thereof.

2. Description of the Prior Art

Pixel interpolation operations are an image processing technique that has widespread applications. For example, pixel interpolation operations are used for generating desired pixel values when performing an image de-interlacing process or image scaling process. Hence, how pixel interpolation operations are implemented imposes quite an influence on image quality. However, applying conventional pixel interpolation methods may lead to inferior image quality if certain patterns appear in the images upon which they are applied.

Please refer to FIG. 1. FIG. 1 is a diagram showing performing edge detection when performing an intra-field interpolation according to the conventional art. In each image field (be it an odd image field or an even image field), a plurality of scan lines are included, whereof each scan line includes a plurality of pixels. For easy explanation, only two scan lines (herein termed as a first scan line and a third scan line) of the odd image field are shown, each of which respectively shows seven pixels: $P_{11}$, $P_{12}$, $P_{13}$, $P_{14}$, $P_{15}$, $P_{16}$, $P_{17}$ in the first scan line, and $P_{31}$, $P_{32}$, $P_{33}$, $P_{34}$, $P_{35}$, $P_{36}$, $P_{37}$ in the third scan line, and it is assumed that the pattern in the original picture is an oblique white line extending from the upper right corner to lower left corner at an image area comprising the above listed pixels. Hence, pixel values of the seven pixels of the first scan line are respectively 0, 0, 0, 0, 255, 255, and 0, while pixel values of the seven pixels of the third scan line are respectively 0, 255, 255, 0, 0, 0, and 0 (a pixel value of 0 represents the color of black and 255 represents while). Obviously, when performing interpolation using the first scan line and the third scan line to render a second scan line which lies therebetween, in order to correctly reconstruct an oblique white line, theoretically speaking the interpolation should result in a pixel value of a pixel $P_{24}$ of the second scan line to be 225. However, if, during inter-field interpolation, edge detection is performed based on a well known and commonly adopted three-pixel block search technique, an edge along the upper right-lower left direction will not be chosen; to the contrary, an edge along the upper left-lower right direction will be chosen. This will lead to an incorrect interpolation result of the pixel value of $P_{24}$ being 0, which in turn results in unpleasant visual effect such as broken lines and flickering in the image displayed.

Please refer to FIG. 2, which is a diagram showing performing motion detection during a de-interlacing operation in the conventional art. As shown in FIG. 2, a frame 200, with its pixel values on the various pixel lines being respectively (255, 255, 255), (255, 255, 255), (255, 255, 255), (0, 0, 0), (0, 0, 0), and (255, 255, 255), is composed of an odd image field 210, comprising pixels ($P_{o11}$, $P_{o12}$, $P_{o13}$), ($P_{o21}$, $P_{o22}$, $P_{o23}$), and ($P_{o31}$, $P_{o32}$, $P_{o33}$), and an even image field 220, comprising pixels ($P_{e11}$, $P_{e12}$, $P_{e13}$), ($P_{e21}$, $P_{e22}$, $P_{e23}$), and ($P_{e31}$, $P_{e32}$, $P_{e33}$). In the conventional art, the determination of whether motion exists where the pixel $P_{o22}$ of the odd field 210 is located, is generally made by calculating a sum of absolute difference, or SAD, between a plurality of pixels comprising $P_{o22}$ and its neighboring pixels $P_{o11}$, $P_{o12}$, $P_{o13}$, $P_{o21}$, $P_{o23}$, $P_{o31}$, $P_{o32}$, and $P_{o33}$, and a plurality of pixels comprising those pixels located at corresponding positions in an adjacent field, such as the even field; for example, the pixel $P_{e22}$ and its neighboring pixels $P_{e11}$, $P_{e12}$, $P_{e13}$, $P_{e21}$, $P_{e22}$ $P_{e23}$, $P_{e31}$, $P_{e32}$, and $P_{e33}$, and then checking if the SAD exceeds a threshold value, such as 1500. If the SAD exceeds the threshold, it is determined to have motion; otherwise, it is determined as still. For example, the frame 200 is actually a still image, but in this case because the SAD is calculated as 1530 (255×6), which is larger than the threshold value 1500, the image is viewed as having motion. As a result, intra-field interpolation is selected over inter-field interpolation for de-interlacing at the pixel $P_{o22}$ of the odd image field 210, which eventually causes image flicker phenomenon.

SUMMARY OF THE INVENTION

It is an objective of the present invention to provide an edge detection method, a motion detection method, a pixel interpolation method, and apparatuses thereof, which, during edge detection or motion detection, or during pixel interpolation operation, perform up-sampling upon images to improve the accuracy of edge or motion detection, and to improve the quality of the images after interpolation.

According to an embodiment of the present invention, a pixel interpolation method for interpolating a pixel value of a target pixel on a target picture is disclosed. The pixel interpolation method includes performing up-sampling upon the target picture for generating an up-sampled picture corresponding to the target picture, and interpolating the target pixel according to the up-sampled picture.

According to an embodiment of the present invention, a pixel interpolation device used for interpolating an input image to generate an output image is disclosed. The pixel interpolation device includes an up-sampling unit and a pixel interpolation unit. The up-sampling unit is used for performing up-sampling upon the input image to generate an up-sampled image. The pixel interpolation unit is coupled to the up-sampling unit for generating the output image according to the up-sampled image. The pixel interpolation unit includes an edge detector and a motion detector. The edge detector is used for performing an edge detection according to the up-sampled image, and the motion detector is used for performing a motion detection according to the up-sampled image.

According to an embodiment of the present invention, an edge detection device is disclosed. The edge detection device includes an up-sampling unit and an edge detector. The up-sampling unit is used for performing up-sampling upon a target picture to generate an up-sampled picture corresponding to the target picture. The edge detector is used for performing an edge detection on the target picture according to the up-sampled picture. The up-sampling unit is further used for interpolating and generating a third pixel in between a first pixel and a second pixel that are a pair of two adjacent pixels of each horizontal pixel line of the target picture, wherein a pixel value of the third pixel is an average of pixel values of the first pixel and the second pixel.

According to an embodiment of the present invention, a motion detection device is disclosed. The motion detection device includes an up-sampling unit and a motion detector. The up-sampling unit is used for performing up-sampling upon a target picture to generate an up-sampled picture corresponding to the target picture. The motion detector is used for performing a motion detection on the target picture according to the up-sampled picture. The up-sampling unit is further used for interpolating and generating a third pixel in between a first pixel and a second pixel that are a pair of two adjacent pixels of each vertical pixel line of the target picture, wherein a pixel value of the third pixel is an average of pixel values of the first pixel and the second pixel.

These and other objectives of the present invention will no doubt become obvious to those of ordinary skill in the art after reading the following detailed description of the preferred embodiment that is illustrated in the various figures and drawings.

DETAILED DESCRIPTION

For easy illustration of the pixel interpolation device and method thereof according to the present invention, the following embodiments take a de-interlacing process of flat panel displays (FPD) or digital televisions (DTV) adopting flat panel display technology as an example. A person familiar with image processing techniques should be able to understand that the present invention can be implemented in other pixel interpolation applications such as image scaling, and be expanded to the use in other applications after understanding the embodiments disclosed in the present invention and the spirit of the present invention.

Figure 1:
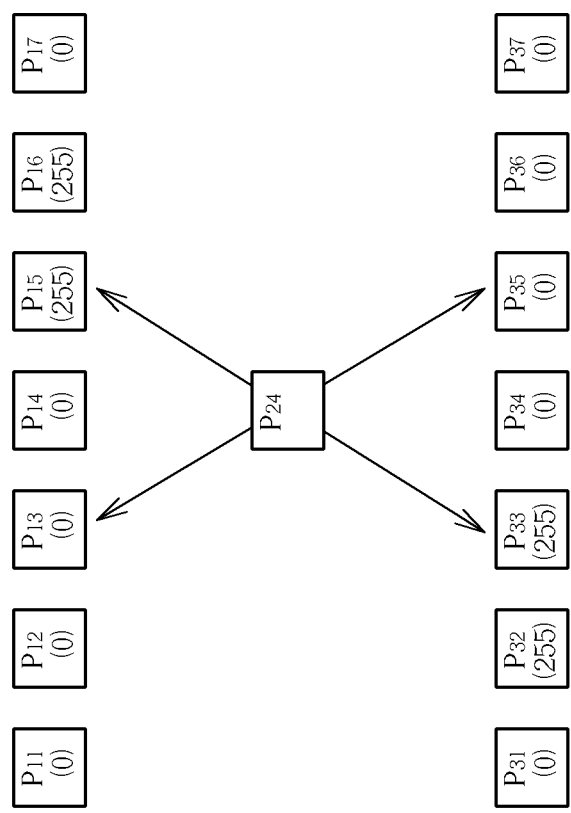
FIG. 1 is a diagram showing an example of edge detection according to the conventional art.
Figure 2:
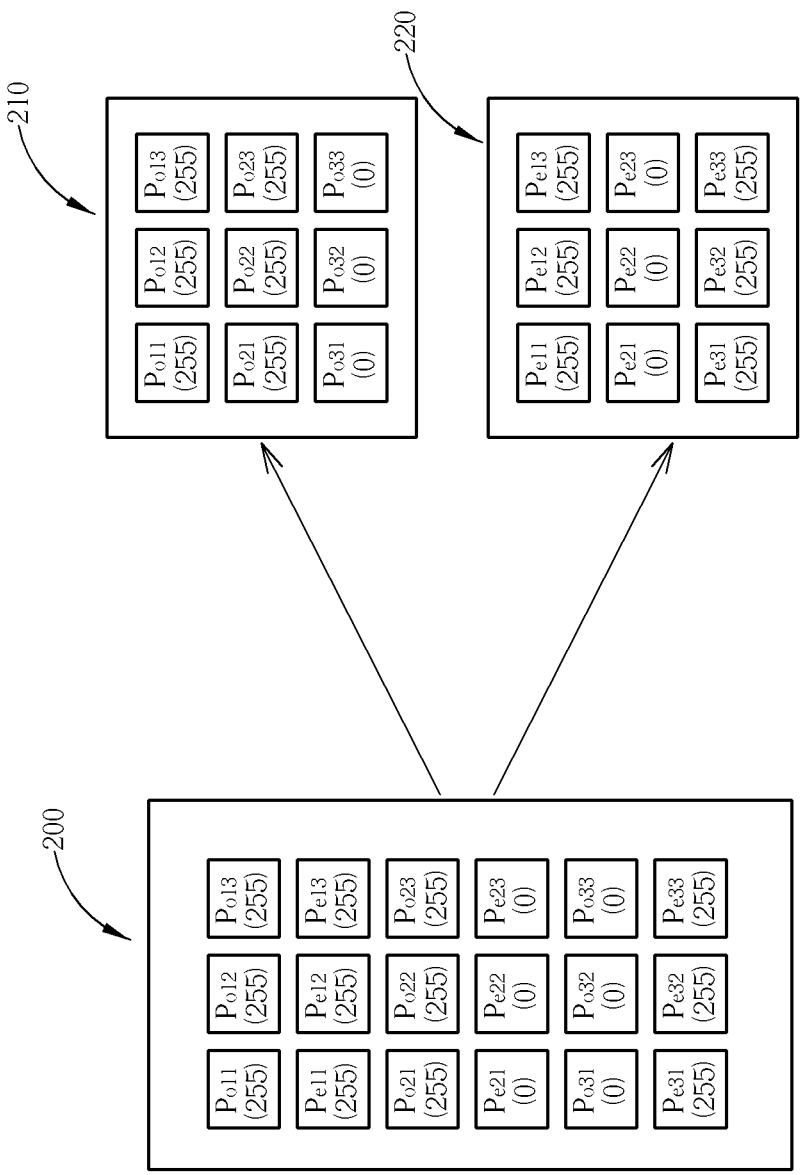
FIG. 2 is a diagram showing an example of motion detection according to the conventional art.
Figure 3:
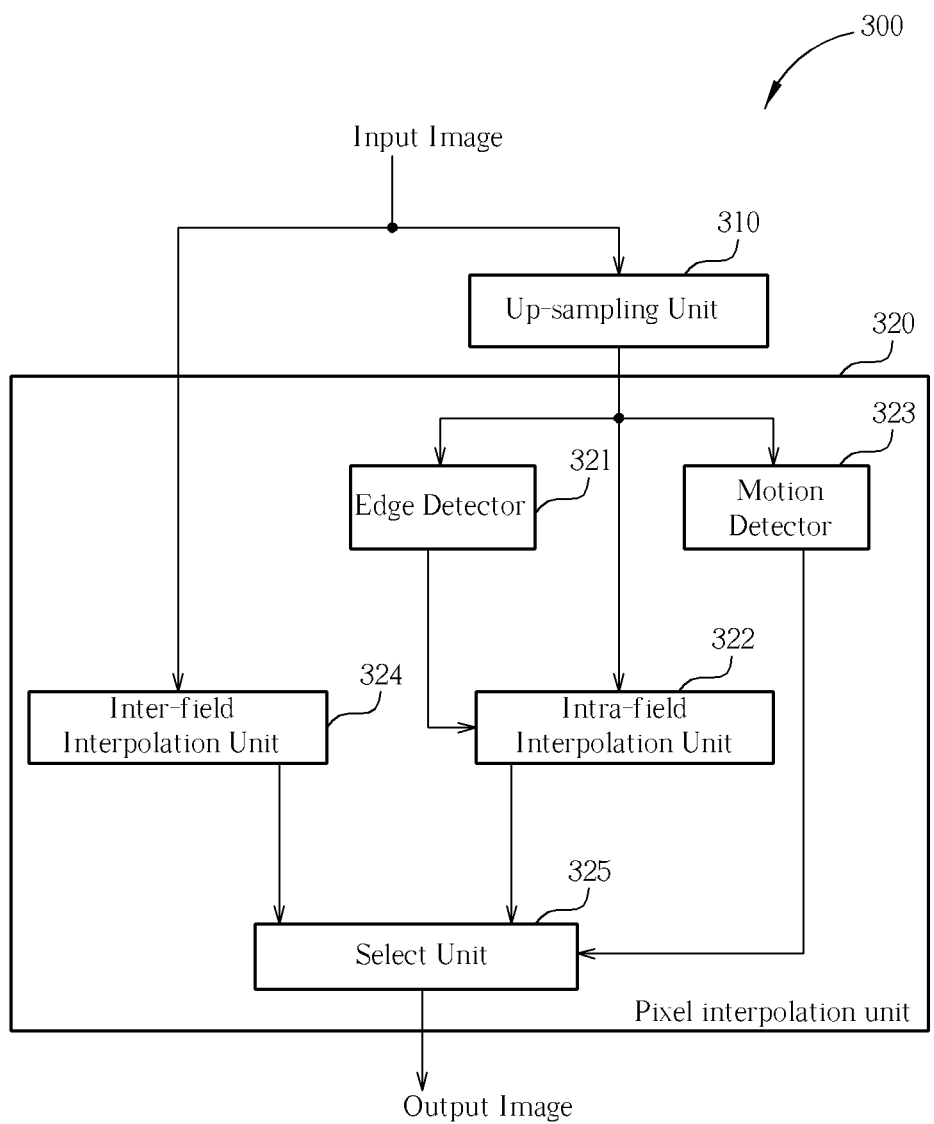
FIG. 3 is a block diagram of a pixel interpolation device according to a first embodiment of the present invention.

Please refer to FIG. 3. FIG. 3 is a block diagram of a pixel interpolation device 300 according to a first embodiment of the present invention. As shown in FIG. 3, the pixel interpolation device 300 is used for performing a de-interlacing processing on a target picture (such as an odd image field or an even image field) to generate a pixel value of a target pixel. The pixel interpolation device 300 includes an up-sampling unit 310 and a pixel interpolation unit 320. In this embodiment, the up-sampling unit 310 generates an extra pixel value in between every pair of two adjacent pixels of each pixel line (such as horizontal pixel lines and/or vertical pixel lines) of the target picture according to an up-sampling algorithm. Therefore, an up-sampled picture corresponding to the target picture is generated. In this embodiment, the up-sampling algorithm averages the pixel values of the above-mentioned two adjacent pixels to render the extra pixel value. Implementations of the up-sampling algorithm are well known by persons who are familiar with the relevant art; for example, line buffers or field buffers are used for storing the inputted pixel values and then basic operation units such as adders and shifters are used for performing an average operation on the stored pixel values, and therefore further details of the relative operations are not herein explained. In addition, the up-sampling algorithm is not limited to the embodiment disclosed in the present invention, and other operation rules or other algorithms of calculating pixel values can be adopted.

The pixel interpolation unit 320 generates the target pixel according to the up-sampled picture. In this embodiment, the pixel interpolation unit 320 further includes an edge detector 321, an intra-field interpolation unit 322, a motion detector 323, an inter-field interpolation unit 324, and a select unit 325. As shown in FIG. 3, the edge detector 321 performs an edge detection according to the up-sampled picture, and the intra-field interpolation unit 322 performs an intra-field interpolation on the up-sampled picture according to the result of the edge detection. Furthermore, the motion detector 323 performs a motion detection according to the up-sampled picture to determine whether the target picture has a motion and degree of motion, and the inter-field interpolation unit 324 performs an inter-field interpolation on the original target picture before up-sampling. Finally, the select unit 325 determines whether to select the result of the intra-field interpolation or the result of the inter-field interpolation as the output image, according to the motion detection result of the motion detector 323. In this embodiment, the select unit 325 outputs the result of the inter-field interpolation when the target pixel is determined as a still object, and the select unit 325 outputs the result of the intra-field interpolation when the target pixel is determined as a moving object.

In the above embodiment, realization of the components such as the edge detector 321, the motion detector 323, the intra-field interpolation unit 322, and the inter-field interpolation unit 324 is well known by persons that are familiar with image processing technologies, and are thus not further described herein in detail. In this embodiment, the select unit 325 can be implemented by a commonly seen multiplexer, or can be implemented by other known or novel circuit components. Moreover, the select unit 325 can be replaced by more complicated operation units, which perform a weighted average operation on the result of the intra-field interpolation and the result of the inter-field interpolation, to generate the output image.

Figure 4:
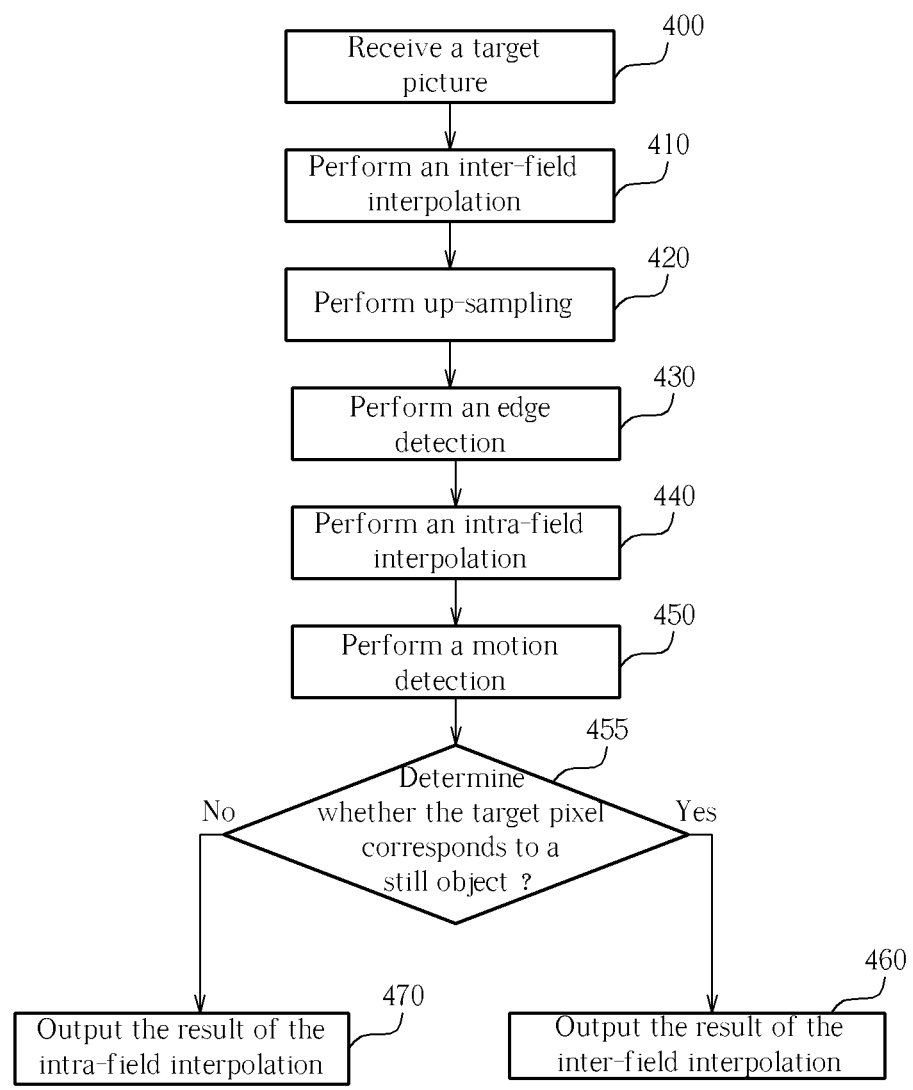
FIG. 4 is a flowchart showing the interpolation operation performed by the pixel interpolation device in FIG. 3.

FIG. 4 is a flowchart showing the interpolation operation performed by the pixel interpolation device 300 in FIG. 3. Please note that the order of each step in the flowchart serves only as one example, and the present invention is not limited thereto. The interpolation operation includes the following steps:

Step 400: Receive a target picture of the inputted image.

Step 410: Perform an inter-field interpolation. The inter-field interpolation unit 324 performs an inter-field interpolation on the pixels of the original target picture, to generate the target pixel.

Step 420: Perform up-sampling. The up-sampling unit 310 performs up-sampling upon the target picture to generate an up-sampled picture corresponding to the target picture.

Step 430: Perform an edge detection. The edge detector 321 performs the edge detection on the up-sampled picture.

Step 440: Perform an intra-field interpolation. The intra-field interpolation unit 322 performs the intra-field interpolation to generate the target pixel according to the result of the edge detection and the up-sampled picture.

Step 450: Perform a motion detection. The motion detector 323 performs the motion detection on the up-sampled picture.

Step 455: Determine whether the target pixel corresponds to a still object according to the result of the motion detector 323. The process goes to step 460 if the target pixel corresponds to a still object; otherwise, the process goes to step 470 if the target pixel corresponds to a moving object.

Step 460: Output the result of the inter-field interpolation. The select unit 325 selects the result of the inter-field interpolation as the output image.

Step 470: Output the result of the intra-field interpolation. The select unit 325 selects the result of the intra-field interpolation as the output image.

Figure 5:
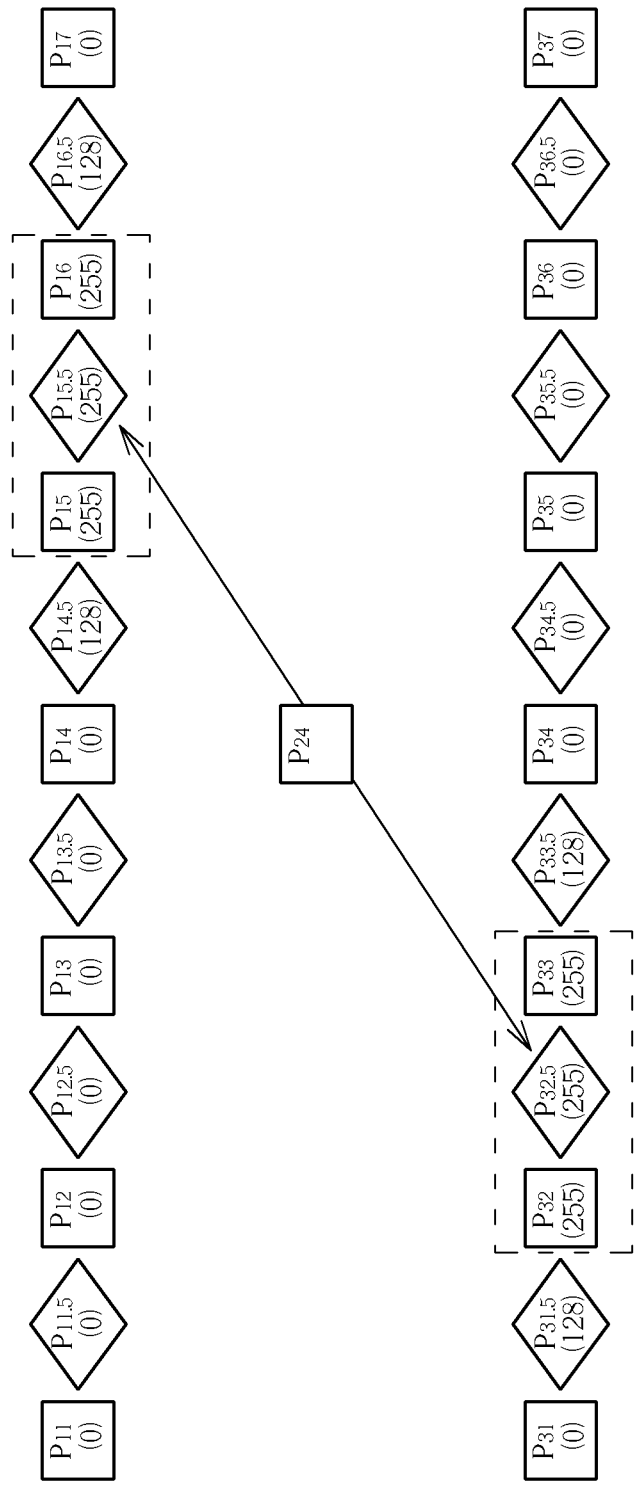
FIG. 5 is a diagram showing an example of edge detection according to an embodiment of the present invention.

Please refer to FIG. 5, which is a diagram showing an example of edge detection according to an embodiment of the present invention. In the original target picture (an odd image field or an even image field), a plurality of scan lines are included, whereof each scan line includes a plurality of pixels. For easy explanation, only two scan lines (for example, a first scan line and a third scan line) of the odd image field are shown in FIG. 5, wherein each of them respectively shows seven pixels $P_{11}$, $P_{12}$, $P_{13}$, $P_{14}$, $P_{15}$, $P_{16}$, $P_{17}$, and $P_{31}$, $P_{32}$, $P_{33}$, $P_{34}$, $P_{35}$, $P_{36}$, $P_{37}$, and it is then assumed that a pattern in the original picture is an oblique white line extending from an upper right corner to a lower left corner; that is, the pixel values of the seven pixels of the first scan line respectively correspond to 0, 0, 0, 0, 255, 255, and 0, and the pixel values of the seven pixels of the third scan line respectively correspond to 0, 255, 255, 0, 0, 0, and 0, wherein the pixel value 0 represents the color of black and 255 represents white. Please note that the number of scan lines and the number of pixels in each scan line in FIG. 5 are illustrated only for the purpose of description, and are not meant to be limiting.

In this embodiment, the up-sampling unit 310 first up-samples the first scan line and the third scan line to render $P_{11}$ $P_{11.5}P_{12}P_{12.5}P_{13}P_{13.5}P_{14}P_{14.5}P_{15}P_{15.5}P_{16}P_{16.5}P_{17}$ and $P_{31}P_{31.5}P_{32}P_{32.5}P_{33}P_{33.5}P_{34}P_{34.5}P_{35}P_{35.5}P_{36}P_{36.5}P_{37}$, wherein $P_{11.5}$ is the average of the $P_{11}$ and the $P_{12}$, and so on and so forth. Consequently, in this example the pixel values correspond to the thirteen pixels of the first scan line are respectively 0, 0, 0, 0, 0, 0, 0, 128, 255, 255, 255, 128, and 0, and the pixel values correspond to the thirteen pixels of the third scan line are respectively 0, 128, 255, 255, 255, 128, 0, 0, 0, 0, 0, 0, and 0. Obviously, here even if the edge detection still adopts the three-point block search when performing an inter-field interpolation, the edge of upper right-lower left direction will nonetheless be correctly chosen due to the pixel values of $P_{15}P_{15.5}P_{16}$ being 255, 255, 255 and the pixel values of $P_{32}P_{32.5}P_{33}$ being 255, 255, 255. Hence, the pixel value of the pixel $P_{24}$ of the second scan line between the first scan line and the third scan line is correctly interpolated as 255, which results in display of an oblique white line as should be, and solves the aforementioned problems.

Figure 6:
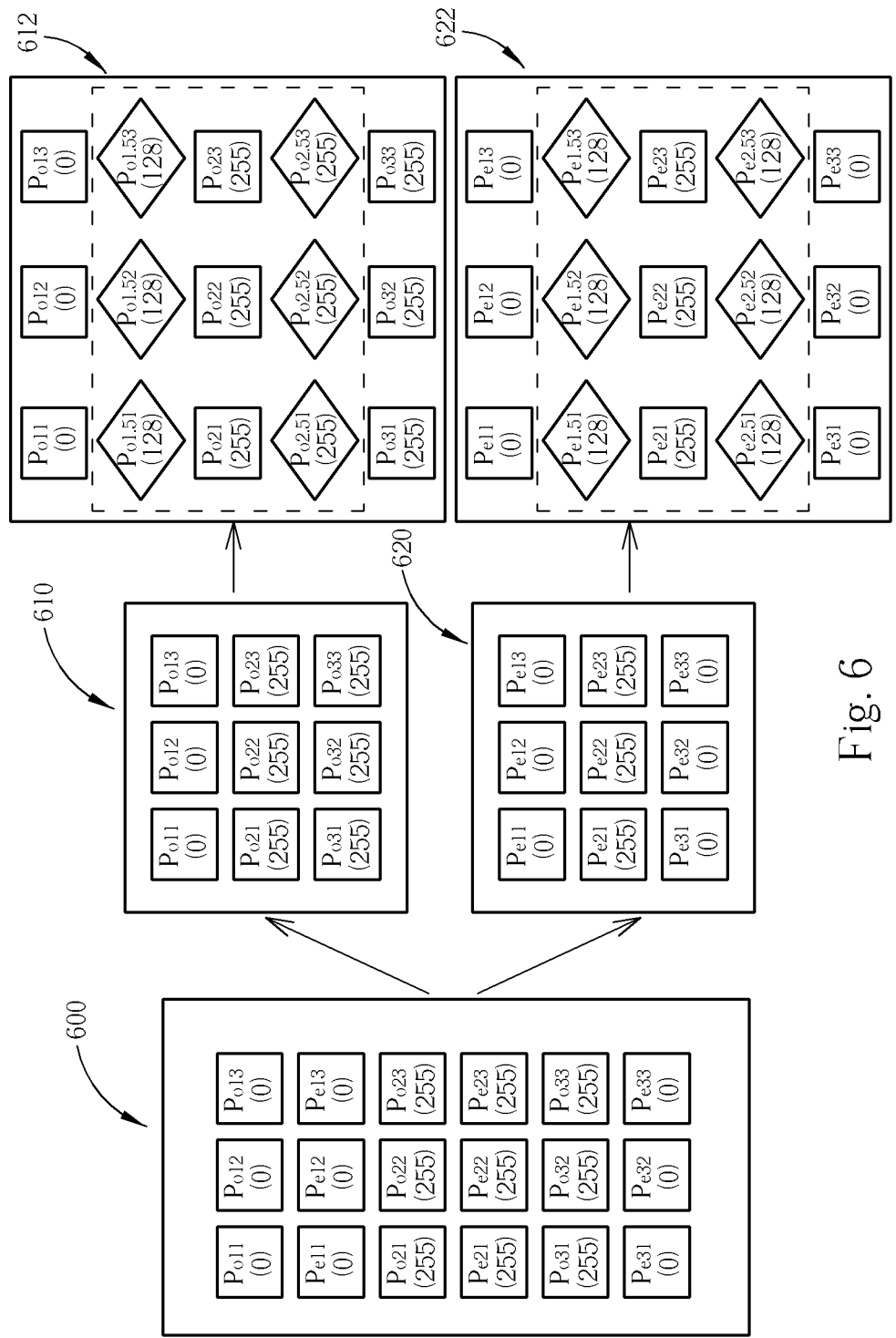
FIG. 6 is a diagram showing an example of motion detection according to an embodiment of the present invention.

Please refer to FIG. 6, which is a diagram showing an example of motion detection according to an embodiment of the present invention. As shown in FIG. 6, a frame 600, with pixel values on each pixel line respectively being (0, 0, 0), (0, 0, 0), (255, 255, 255), (255, 255, 255), (255, 255, 255), and (0, 0, 0), is composed of an odd image field 610 comprising ($P_{o11}$, $P_{o12}$, $P_{o13}$), ($P_{o21}$, $P_{o22}$, $P_{o23}$), and ($P_{o31}$, $P_{o32}$, $P_{o33}$), and an even image field 620 comprising ($P_{e11}$, $P_{e12}$, $P_{e13}$), ($P_{e21}$, $P_{e22}$, $P_{e23}$), and ($P_{e31}$, $P_{e32}$, $P_{e33}$). Please note that the number of scan lines and the number of pixels included in each scan line in FIG. 6 are only an example, and are not meant to be limiting. The up-sampling unit 310 respectively up-samples the odd image field 610 and the even image field 620 to generate an up-sampled odd image field 612 and an up-sampled even image field 622. Please note that the up-sampling unit 310 interpolates and generates a third pixel in between a first pixel and a second pixel of each pair of two adjacent pixels on vertical pixel lines, for example, by averaging $P_{o11}$ and $P_{o21}$ to give $P_{o1.5}$.

As noted above, in the conventional art whether the image at the pixel $P_{o22}$ of the odd image field 210 has motion is determined by calculating the sum of absolute differences (SAD) between the plurality of pixels comprising the pixel $P_{o22}$ and its neighboring pixels $P_{o11}$, $P_{o12}$, $P_{o13}$, $P_{o21}$, $P_{o23}$, $P_{o31}$, $P_{o32}$, and $P_{o33}$ of the odd image field 210, and the plurality of pixels at corresponding positions in the image field adjacent to said odd image field 210, e.g., the even field 220, comprising the pixel $P_{e22}$ and its adjacent pixels $P_{e11}$, $P_{e12}$, $P_{e13}$, $P_{e21}$, $P_{e22}$ $P_{e23}$, $P_{e31}$, $P_{e32}$, and $P_{e33}$, and then determining whether the sum of absolute differences reaches to a threshold value (such as 1500). If the sum of absolute differences exceeds the threshold, it is determined as having motion; otherwise, it is determined as still. But in this embodiment, whether the image at the pixel $P_{o22}$ of the odd image field 610 has motion is determined by calculating the sum of absolute differences (SAM) between the pixel $P_{o22}$ and the pixels adjacent to the pixel $P_{o22}$ ($P_{o1.51}$, $P_{o1.52}$, $P_{o1.53}$, $P_{o21}$, $P_{o23}$, $P_{o2.51}$, $P_{o2.52}$, and $P_{o2.53}$) of the up-sampled odd image field 612 and the pixels at corresponding locations of the image field adjacent to the up-sampled odd image field 612, such as the pixel $P_{e22}$ of the even image field 220 and the pixels adjacent to the pixel $P_{e22}$ ($P_{e1.51}$, $P_{e1.52}$, $P_{e1.53}$, $P_{e21}$, $P_{e22}$, $P_{e23}$, $P_{e2.51}$, $P_{e2.52}$, and $P_{e2.53}$) of the up-sampled even image field 622 and determining whether the sum of absolute differences reaches to a threshold value (such as 1500). If the sum of absolute differences is over the threshold, it is determined to have motion; otherwise, it is determined as still. As can be readily observed by a person skilled in the art, the SAD value (128×3=384) calculated according to this embodiment is, unlike that calculated in the conventional art which leads to erroneous judgment, smaller than the threshold value 1500, and can correctly determine a still target pixel as still. Hence, the present invention that performs the motion detection on the up-sampled picture can effectively avoid conventional art erroneous judgment during motion detection. Consequently, image flicker caused by misplaced use of intra-field interpolation can be avoided.

Figure 7:
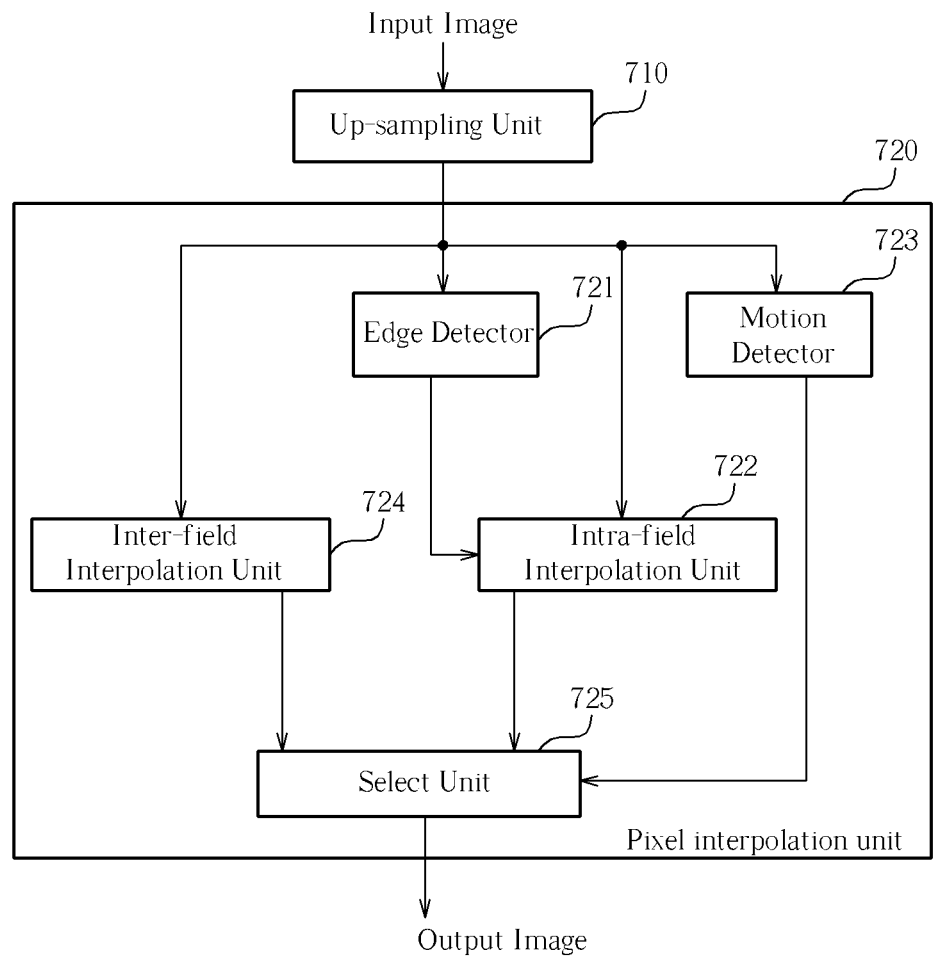
FIG. 7 is a block diagram of a pixel interpolation device according to a second embodiment of the present invention.

Please note that although the intra-field interpolation unit 322 performs the intra-field interpolation on pixel information of the up-sampled picture and the inter-field interpolation unit 324 performs the inter-field interpolation on pixel information of the original target picture, these do not serve as limitations of the present invention. A skilled artisan would be able to appreciate that the advantages of the present invention still prevail, no matter whether the intra-field interpolation unit 322 uses the picture before up-sampling or the picture after up-sampling for performing the interpolation operation, and no matter whether the inter-field interpolation unit 324 uses the picture before up-sampling or the picture after up-sampling for performing the interpolation operation. FIG. 7 is an exemplary diagram showing both an intra-field interpolation unit 722 and an inter-field interpolation unit 724 utilizing the up-sampled picture for performing the interpolation operation. Similarly, although both the edge detector 721 and the motion detector 723 utilize pixel information of the up-sampled picture for performing the detection, this is not a limitation to the present invention. Even if only one of them uses the pixel information after up-sampling, it can still enjoy the advantages of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel interpolation method for interpolating a target picture, the pixel interpolation method comprising:
   performing up-sampling upon the target picture for generating an up-sampled picture corresponding to the target picture;
   performing edge detection and motion detection on the up-sampled picture in parallel;
   performing inter-field interpolation on the target picture to generate a result of the inter-field interpolation, and performing intra-field interpolation on the up-sampled picture according to a result of the edge detection to generate a result of the intra-field interpolation; and
   selecting the result of the inter-field interpolation or the result of the intra-field interpolation as a result of interpolating the target picture according to a result of motion detection operation.

2. The pixel interpolation method of claim 1, wherein the target picture is an image field.

3. The pixel interpolation method of claim 1, wherein a pixel value of an extra pixel disposed between adjacent pixels of the target picture is an average of pixel values of two original adjacent pixels of a pixel line.

4. A pixel interpolation device used for interpolating an input image to generate an output image, the pixel interpolation device comprising:
   an up-sampling unit used for performing up-sampling upon the input image to generate an up-sampled image;
   a pixel interpolation unit coupled to the up-sampling unit and comprising:
      an edge detector for performing edge detection on the up-sampled image;
      a motion detector for performing motion detection on the up-sampled image, wherein the edge detector and the motion detector are configured to perform the respective edge detection and motion detection operations in parallel;
      an inter-field interpolation unit for performing inter-field interpolation on the input image to generate a result of the inter-field interpolation;
      an intra-field interpolation unit for performing intra-field interpolation on the up-sampled image according to a result of the edge detection to generate a result of the intra-field interpolation; and
      a select unit for selecting the result of the inter-field interpolation or the result of the intra-field interpolation as a result of interpolating the input image according to a result of motion detection operation.

5. The pixel interpolation device of claim 4, wherein the up-sampling unit performs up-sampling upon the input image in a horizontal direction.

6. The pixel interpolation device of claim 4, wherein the up-sampling unit performs up-sampling upon the input image in a vertical direction.

7. The pixel interpolation device of claim 4, wherein the pixel interpolation unit is a de-interlacing device.

* * * * *